United States Patent
Dove

(10) Patent No.: US 9,231,703 B2
(45) Date of Patent: Jan. 5, 2016

(54) OPTICAL NODE CONFIGURATION APPARATUS

(71) Applicant: ACI Communications, Inc., Kent, WA (US)

(72) Inventor: Donald Charles Dove, Kent, WA (US)

(73) Assignee: ACI Communications, Inc., Kent, WA (US)

( * ) Notice: Subject to any disclaimer, the term of this patent is extended or adjusted under 35 U.S.C. 154(b) by 447 days.

(21) Appl. No.: 13/677,178

(22) Filed: Nov. 14, 2012

(65) Prior Publication Data

US 2013/0121636 A1 May 16, 2013

Related U.S. Application Data

(60) Provisional application No. 61/559,629, filed on Nov. 14, 2011.

(51) Int. Cl.
| | |
|---|---|
| G02B 6/26 | (2006.01) |
| G02B 6/42 | (2006.01) |
| H04B 10/27 | (2013.01) |
| G02B 6/35 | (2006.01) |
| H04B 10/25 | (2013.01) |
| H04B 10/29 | (2013.01) |
| H04Q 11/00 | (2006.01) |

(52) U.S. Cl.
CPC *H04B 10/27* (2013.01); *G02B 6/35* (2013.01); *H04B 10/2504* (2013.01); *H04B 10/29* (2013.01); *H04Q 11/0005* (2013.01); *H04Q 2011/0015* (2013.01); *H04Q 2011/0043* (2013.01); *H04Q 2011/0047* (2013.01); *H04Q 2011/0052* (2013.01); *Y10S 514/922* (2013.01)

(58) Field of Classification Search
CPC .............................. G02B 6/35; H04J 14/0204
USPC ................... 398/17; 385/136, 158, 208, 5, 45
See application file for complete search history.

(56) References Cited

U.S. PATENT DOCUMENTS

| | | | | | |
|---|---|---|---|---|---|
| 4,965,527 | A | * | 10/1990 | Clark | H03F 3/602 330/124 R |
| 5,394,503 | A | * | 2/1995 | Dietz, Jr. | G02B 6/3895 385/134 |
| 6,128,424 | A | * | 10/2000 | Gampp | G02F 1/035 385/14 |
| 7,660,409 | B1 | * | 2/2010 | Czerwiec | H04M 1/003 379/325 |
| 2003/0185486 | A1 | * | 10/2003 | Bennett | G02B 6/12004 385/15 |
| 2005/0171719 | A1 | * | 8/2005 | Jacobsen | G01R 27/28 702/120 |
| 2006/0008231 | A1 | * | 1/2006 | Reagan | G02B 6/3849 385/135 |
| 2006/0093259 | A1 | * | 5/2006 | Oggioni | G02B 6/43 385/31 |
| 2006/0118331 | A1 | * | 6/2006 | Nelson | H05K 3/242 174/261 |
| 2009/0226168 | A1 | * | 9/2009 | Boduch | H04J 14/0204 398/48 |
| 2010/0210225 | A1 | * | 8/2010 | Lowell | H01P 5/12 455/90.2 |
| 2010/0253435 | A1 | * | 10/2010 | Ichitsubo | H01L 23/16 330/295 |
| 2012/0146721 | A1 | * | 6/2012 | Li | H03F 3/45475 330/69 |

* cited by examiner

Primary Examiner — Ken Vanderpuye
Assistant Examiner — Abbas Alagheband
(74) Attorney, Agent, or Firm — Lowe Graham Jones PLLC

(57) ABSTRACT

A segmented optical node exploits a configuration module having arrayed all elements to go from a 1×4 to a 4×4 configuration, save optional redundant switches. A jumper board in the 1×, 2× path configures the node for 1×4 in one orientation and for 2×4 when flipped around 180 degrees. The 4×4 configuration is achieved by rotating the configuration module 90 degrees. In this orientation power to the module is also off, since the 4× configuration is passive.

12 Claims, 13 Drawing Sheets

OPTICAL NODE CONFIGURATION APPARATUS

PRIORITY CLAIM

This application claims priority to the Provisional application on file under Ser. No. 61/559,629 filed on Nov. 14, 2011.

FIELD OF THE INVENTION

A configurable optical node, more specifically, a segmented bidirectional node is presented.

BACKGROUND OF THE INVENTION

Cable Operators are continually seeking means to meet the demand placed upon them to provide consumers with more services such as video on demand, Internet access, and voice over internet services. Because the laying of fiber is one of the very high costs incumbent upon a provider, Operators strive to configure networks to satisfy the greatest number of customers through existing fiber by understanding that generally the customers have two distinct needs. First, there are needs for broadcast content such as network television contact where content sent in the forward direction is the same across a broad number of consumers. In the business, this is described as point-to-multipoint services. Generally broadcast services are both analog (extending from Channel 2 at (55 MHz) to Channel 79 (553 MHz)) and digital (extending up to, alternatively 650 MHz or 750 MHz depending upon system design parameters).

For consumers there remains a second type of service known as narrowcast services such as Internet Access, telephony, or video on demand. For these services, known in the industry as multipoint-to-multipoint and carried on spectrum above that of broadcast services generally up to 1 GHz, content is unique on each path and there is no means by which to split and amplify a single signal to reach a large number of consumers. Rather each narrowcast signal is generally a single signal that reaches each consumer distinctly and generally is not split. Return path signals are a special case of narrowcasting in that they are unique signals from the consumer back up to the network headend. Return path signals include video on demand control signals, return Internet data, return telephony data. Return path signals are carried to the headend in frequency bands from 5 MHz to 40 MHz.

Optical nodes facilitate the transmission of data in both directions by serving as the connecting device between the higher capacity fiber optic cable that extends from the headend down to the lower capacity coaxial cable that is generally used to connect individual consumers to the network and carries a signal in that part of the signal spectrum known as radio frequency or RF. In its simplest configuration a conventional optical node is said to be in 1×1 configuration when, it receives one set of downstream content from the headend and transmits just one set of upstream return path signals. (1×1 does not refer to the specific relation between numbers of RF ports used but only to the signal relationship between the node and the headend.) For example, in a broadcast forward mode, an optical signal might enter an optical node having four RF ports for output. In this example, the optical node is in 1×1 configuration meaning that the single downstream signal is split and amplified such that all four ports have the same downstream content and all upstream return signals are combined into a single upstream optical signal. If, in this example, the optical node services a community with 1000 consumer households, each RF port might, if the load was perfectly balanced, carry an RF signal sufficient to serve 250 homes.

Distinct from a 1×1 configuration, a 4×4 configuration can be advantageous. As the name indicates the 4×4 optical node receives for forward distinct optical inputs and returns four distinct optical outputs to the headend. In this example, where four RF ports are present, the optical node converts the optical signals to four distinct electrical radio frequency (RF) signals, which it outputs each to one of the four ports. In essence, the system acts as four distinct optical to RF converters and in the reverse direction as RF to optical converts such that the signals inbound have a one to one relationship with the signals outbound. Thus, using a 4×4 optical node to transmit downstream may be costly in terms of fiber needed to service the network.

Because broadcast service can be carried by fewer optical fibers to serve the same community than is required to service the same community with narrowcast service, operators have found that fully segmentable optical nodes (i.e. those that can be configured to either split or combine signals in traversing between optical and RF ports) have great utility in networks. Operators find it difficult and costly to obtain the rights to place a large number of optical nodes at ground level because, often, many other utility providers must compete for the same space. Thus segmented optical nodes are extremely attractive to operators.

Without disturbing the basic fiber complement extending between a headend and the optical node, operators can install distinct configuration modules to distinctly task both optical interfaces and RF ports and can split signals as needed between them to create distinct configurations for both downstream and upstream signal transmission through the node.

Making an optical node capable to serve several distinct segmentation schemes incorporates very distinct power and hardware requirements. A first basic segmentation scheme is known as a 2×2 requires that a second receiver and a second transmitter be installed in the optical node and a pair of two-way splitters is introduced to replace the four-way splitter between the original single receiver/transmitter and the four RF ports.

In a second basic segmentation is known as the 4×4 configuration discussed above, two receivers and two transmitters are added to the two existing receivers and two existing transmitters such that a set of four jumpers is introduced into the system to replace the previous splitter pairs. This 4×4 allows each of a receiver/transmitter pair within the optical node to be commissioned for dedicated service to each of the 4 RF output ports.

Further complications result from the fact that traditional optical nodes rely on passive splitting for the 1×4 and 2×2 configurations, usually combined onto a device often known as a configuration module. As these often passive configuration modules have different split losses, the node is designed such that an amplifier is added to supply enough gain between the receiver and RF output section (called a launch amplifier) to overcome the split loss of the 1×4 split. When configure to facilitate the 2×2 split, the optical node now provides excess gain available because exchanging the two-way splitter for the four-way splitter results a lower loss which designers typically address by introduction of a corresponding amount of fixed attenuation. Similarly the loss of splitters in a 4×4 configuration also requires addition of still further attenuation. One consequence of this process is that, as the number of receivers and transmitters increase, the node consumes proportionately more power.

Unfortunately, as can readily be comprehended, each of these distinct modules with their distinct amplification and attenuation as employed in conventional optical node platforms must be separately designed and constructed. Further, the operator electing to reconfigure an optical node must also accommodate unique traffic management configurations, such as dedicating a receiver to 1 port or splitting 2 ports and dedicating a receiver each to the remaining 2 ports. So apart from requiring separate modules for splitting and amplification must also warehouse custom traffic modules. Individuals servicing the nodes are required to warehouse and keep a complete set of distinct modules on hand in order to configure each optical node as the need arises.

What is needed in the art is a readily configurable optical node that allows configuration with a single configurable module which does not require either unnecessary amplification or power loss.

SUMMARY OF THE INVENTION

A segmented optical node exploits a configuration module having arrayed all elements to go from a 1×4 to a 4×4 configuration, save optional redundant switches. A jumper board in the 1×, 2× path configures the node for 1×4 in one orientation and for 2×4 when flipped around 180 degrees. The 4×4 configuration is achieved by rotating the configuration module 90 degrees. In this orientation power to the module is also off, since the 4× configuration is passive.

In its role managing amplification and splitting across the optical node, the configuration module is a "unity gain" device. That is, no matter what configuration, 1×4, 2×2, 4×4, or other, the gain of the module is zero dB. This means that the split loss is overcome in the module itself, and the path configurations are done by a means of an internal jumper board instead of by changing to a new module. In the 4×4 configuration, the module is simply rotated 90 degrees to completely remove power from the module while establishing the required 4 passive RF paths between each receiver and each launch amplifier port.

Because of the unity gain across the module, the module allows conservation of power compared to all other segmentation designs. Because the configuration module is unity gain, the receiver and launch amplifier gain combined can be sized to provide 8 dB less than in a conventional design (8 dB is the rule-of-thumb split loss of a 4-way splitter). The conservation of amplification allows power saving opportunities in the receiver and launch amplifiers by the reduction of gain requirements in those sections.

Further, the configuration module adds segmentation options that have been impractical to introduce into other node designs due to the need to offer such a large number of configuration board options. Those two additional options are 3+1 and 2+2. Additionally, trans-hinge coaxial cables enable a patch panel, allowing the individual servicing the optical node to configure the ports to manage traffic by simple cable arrangement.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
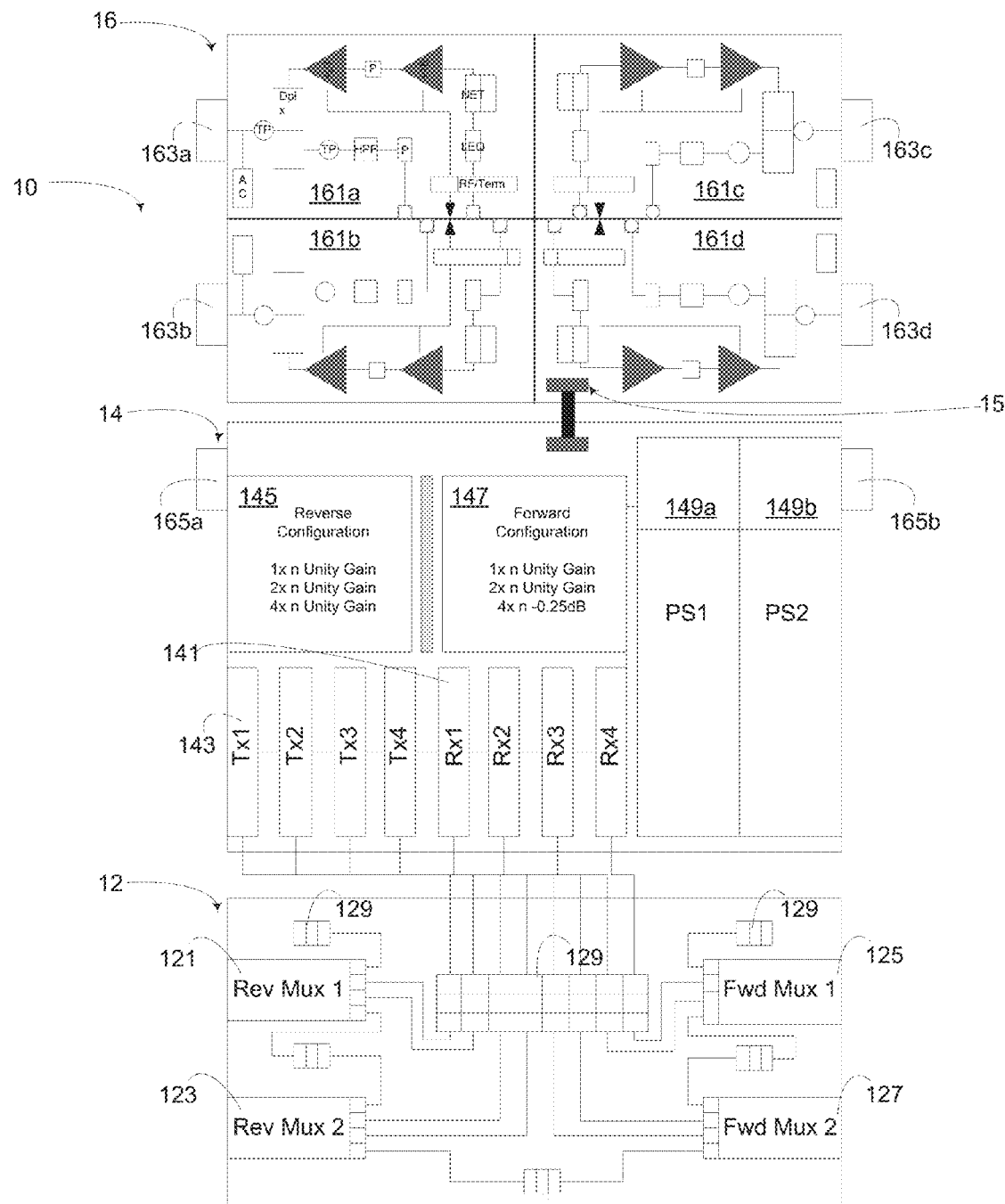
FIG. 1 is a block diagram of an inventive optical node with configuration modules.

FIG. 1 is a block diagram of an inventive optical node 10 comprising three distinct and identifiable elements named for their distinct physical locations: a fiber tray 12; a lid 14 containing each of an inventive forward module 147 along with four optical to RF receivers 141 and an inventive reverse traffic manager module 145 and its four RF to optical transmitters 143; and a base 16 having four distinct launch amplifiers 161a-d and RF ports 163a-d. Two additional hardline RF ports 165a, b are included for dedicated power entry but add no additional RF functionality. As set forth, these two hardline RF ports 165a, b allow for more flexibility in the placement of the power inserter wile alleviating power inserter insertion loss occasioned by relying upon the functional RF ports 163a-d for power insertion. Two power supplies 149a, b are present to condition power supplied to the forward 147 and reverse 145 configuration modules.

The fiber tray 12 includes a series of optical connectors 129 for selectively connecting optical fiber to the fiber tray 12 for input and output of optical signals. The arrangement of connectors 129 with the reverse multiplexers 121, 123 and the forward multiplexers 125, 127 allow user configurable selection of optical connectors 129 for suitable configuration in any of the onboard multiplexers to facilitate several alternate configurations allowing the injection of optical signals in distinct configurations depending upon the needs of the operator.

The lid 14 includes, as indicated above, four transmitters 143 and four receivers 141 which together serve as the interface between the optical fiber that ties the connectors 129 to the multiplexers 121-127 and on into the lid 14. The reverse traffic manager module 145 presents the upstream signal to such of its four RF to optical transmitters 143 as it is configured to use to present to the reverse multiplexers 121, 123 for introduction into such fiber optic fibers as are connected to the connectors 129. In a similar manner, downstream signals are received from the forward multiplexers 125, 127 at the receivers 147. The forward multiplexers 125, 127 receive downstream signals through the connectors 129 to convey through such of the four optical to RF receivers 141 as the forward configuration module 147 tasks. Below the discussion moves to treat the operation of the forward 147 and the reverse 145 configuration modules in greater detail than in this overview of the system.

A series of patch cords 15 are configurable to selectively connect the forward 147 and the reverse 145 configuration modules to the several launch amplifiers 161a-d, through trans-hinge coaxial cables. The trans-hinge coaxial cables allow the user to intuitively connect output of the forward 147 and the reverse 145 configuration modules to such of four launch amplifiers 161a-d located in the base 16 according to the desired configuration. Simple columnar tables can be included within the base to facilitate the connections necessary.

In the base 16, four bidirectional launch amplifiers 161a-d are each arranged to condition the signals for the inbound and outbound signals through dedicated RF ports 163a-d coupled to each of the launch amplifiers 161a-d. Because these are the principle power consumption devices within the optical node 10, the arrangement of the launch amplifiers 161a-d, within the base (in the presently preferred embodiment an aluminum casting having heat sink convection fins to dissipate heat generated in signal amplification).

Figure 2:
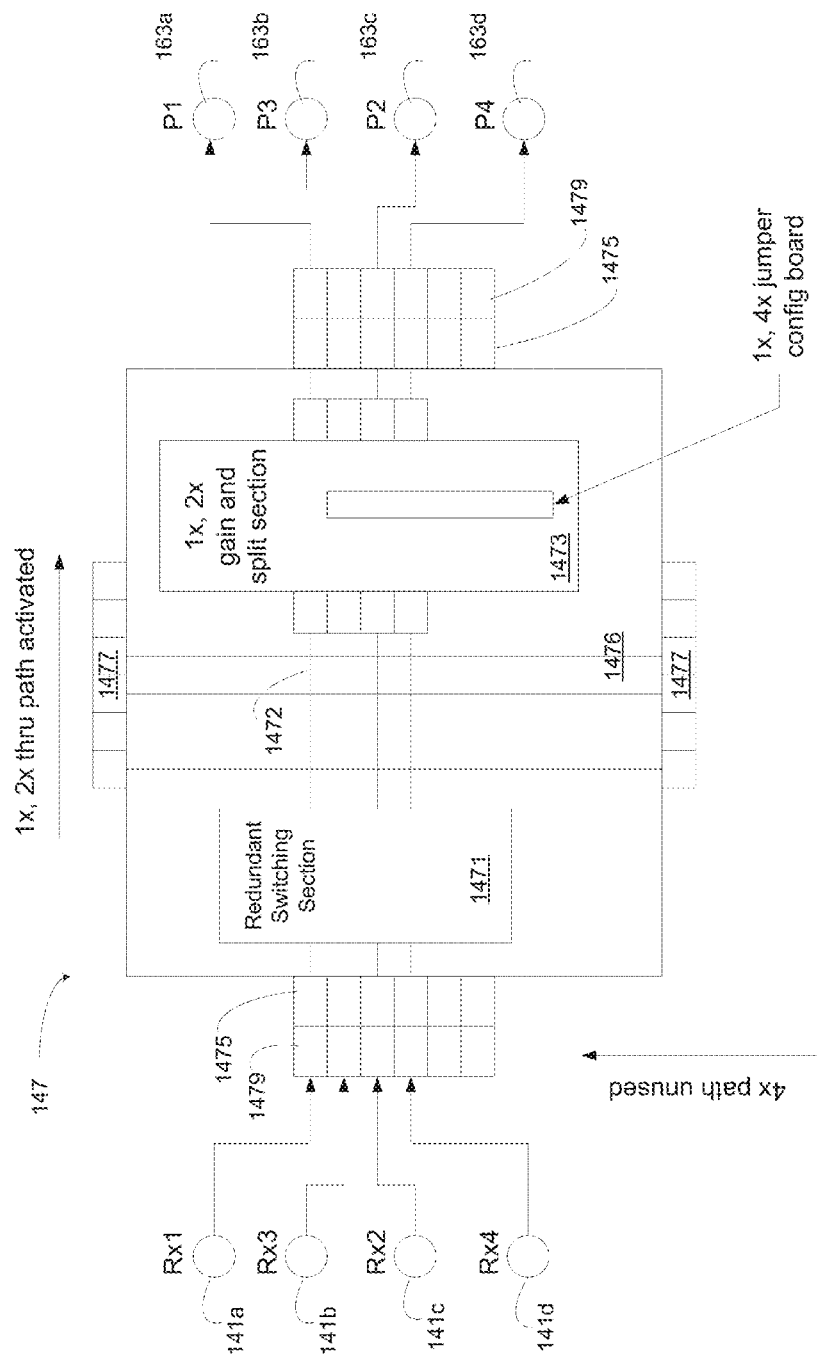
FIG. 2 is a block diagram depicting the configuration module oriented in a socket at 0°.

Referring to FIG. 2, the forward control module 147 (and similarly the reverse control module 145) provides conductivity paths or traces from the receivers 141a-d to the RF ports 163a-d. Within the module 147, a first set of four traces 1472 extends from a redundant switching section 1471 to a gain and split section 1473 to provide multiple switchably configurable unity gain paths through the module 147. When the module 147 is oriented as depicted in FIG. 2 a first set of pins 1475 engage the socket set 1479 on a base printed circuit board to provide switchably configurable set of four traces through the module 147 appropriate for any but the 4×4 configuration of the module (The 4×4 configuration being enabled by a purely unswitched path through the module, (extending from a first set of pins 1477 to a second set of pins 1477, shown) as discussed with reference to FIG. 3 below). In such a manner, the physical configuration of the module 147 with the two sets of pins 1475 and 1477 and two sets of traces connecting those pins are two means to configure the module to present unity gain across the module 147 for each of the configurations in which the module splits and combines signals across the module 147. A user achieves further configuration of the fully configurable module by use of the jumper switch and the gain and split section 1473 as discussed in greater detail below.

Figure 3:
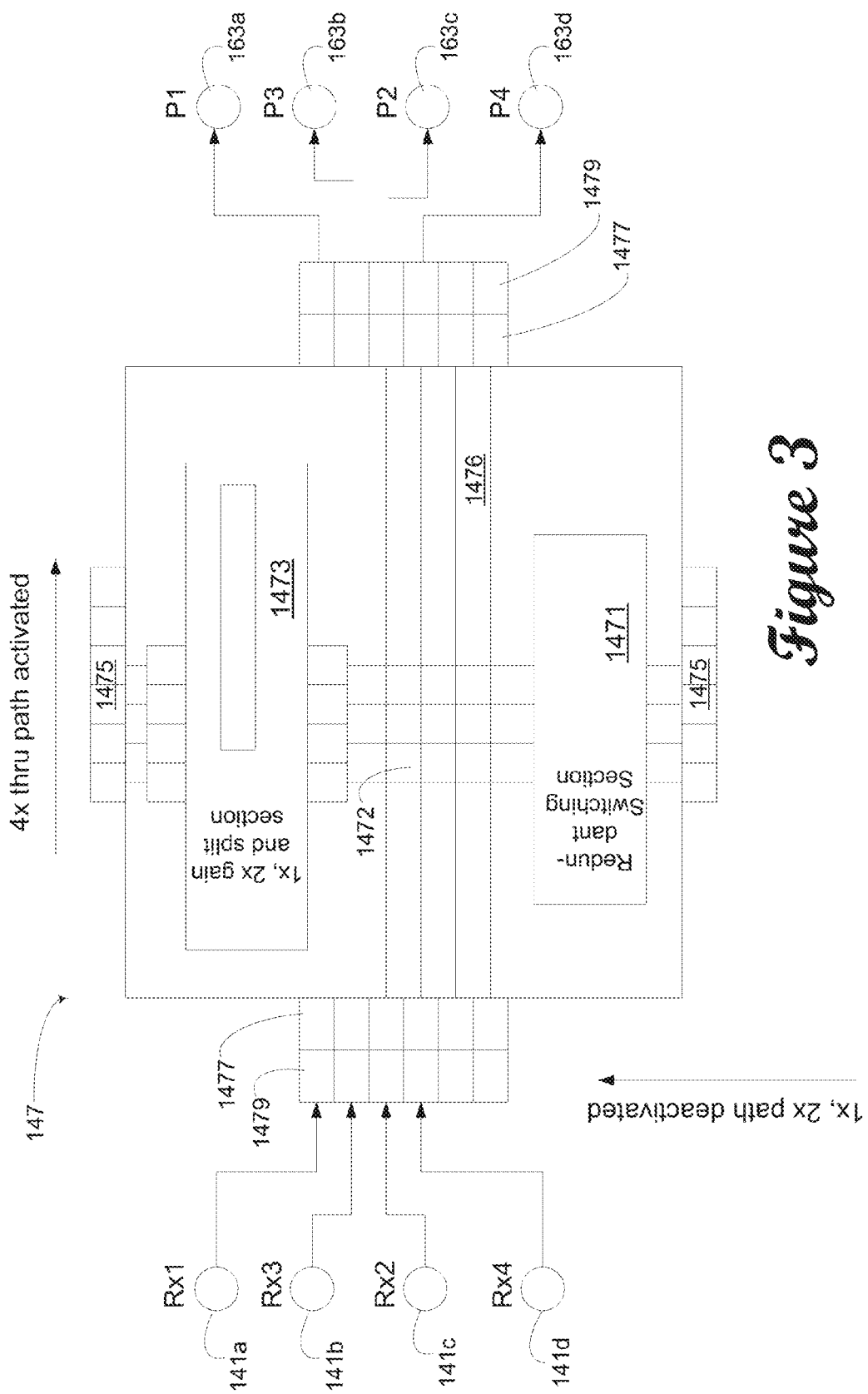
FIG. 3 is a block diagram depicting the configuration module oriented in a socket at 90°.

In contrast, when oriented as depicted in FIG. 3, a second set of pins 1477 engage the socket 1479 which then connect a second set of traces 1476 for a purely passive path from the first set of pins 1477 to the second set of pins 1477 with no switching capacity needed. As these traces are simple straight and nowhere split along the module 147, they have no need for amplification to make up splitting losses. For that reason, when the orientation of the module is rotated as depicted in FIG. 3 unity gain simply describes conductivity along these traces 1476.

The further innovation that is a key to the versatility of the configuration module is depicted in FIGS. 4-7. By judicious selection and geometric configuration of several elemental components, specifically three splitters 14731a-c, two amplifiers 14732a, b (selected to impart gain selected to exactly balance splitter losses), a transverse trace 14735, and two redundant relays 14737a, b, the configuration module can be configured to allow for four distinct configurations in response to positions of a single jumper switch having three positions. The positions for the jumper switch are "1×4", "3+1", and "2×2". When the control module configuration module oriented in the socket at 0°, this switch enables tailoring of the module for any of these three modes and with jumper settings, the presence of the redundant relays allows exploitation of second receivers as backups to first receivers providing a failover capacity in the optical node.

Figure 4:
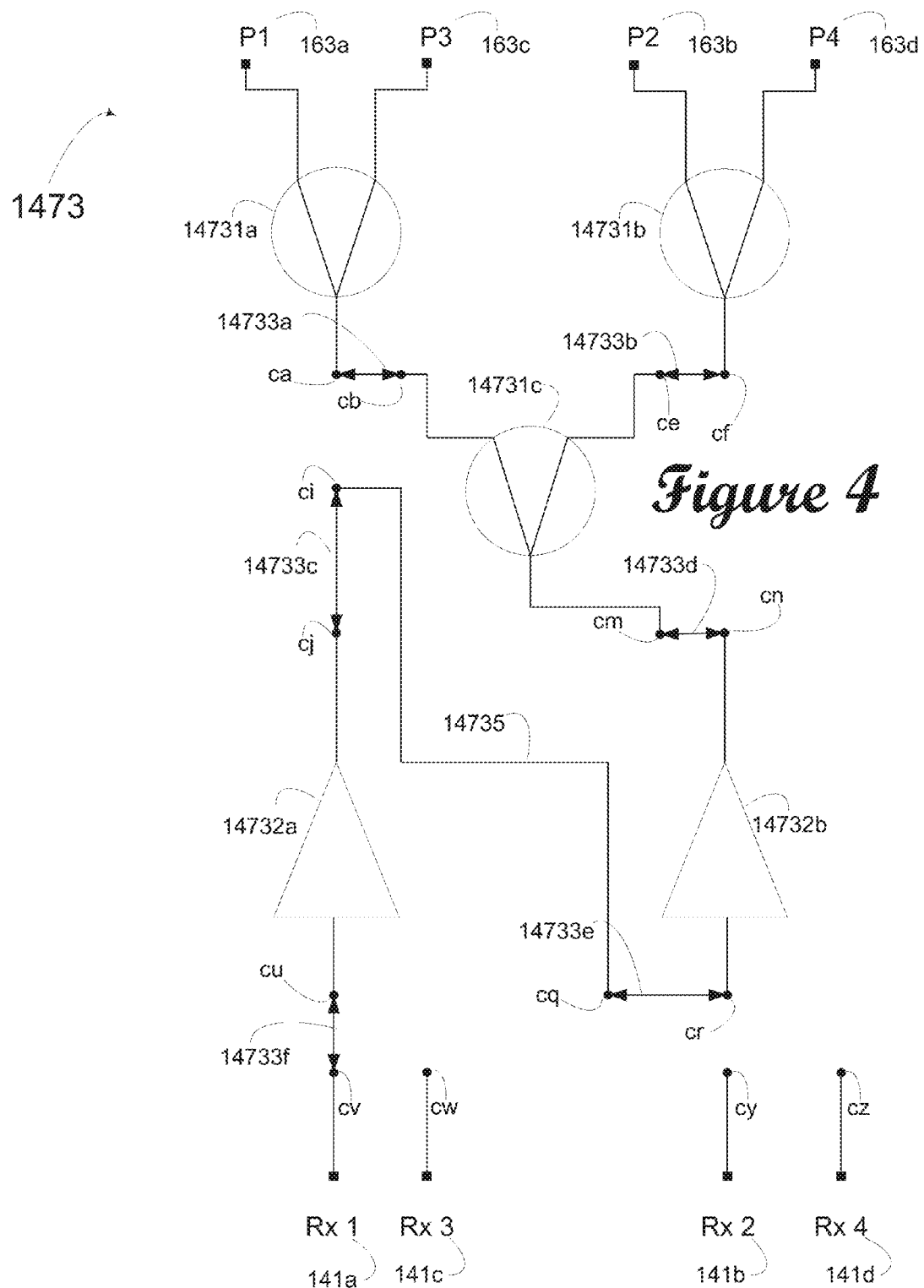
FIG. 4 is a switching diagram depicting the configuration module in a 1×4 with a single jumper board.
Figure 5:
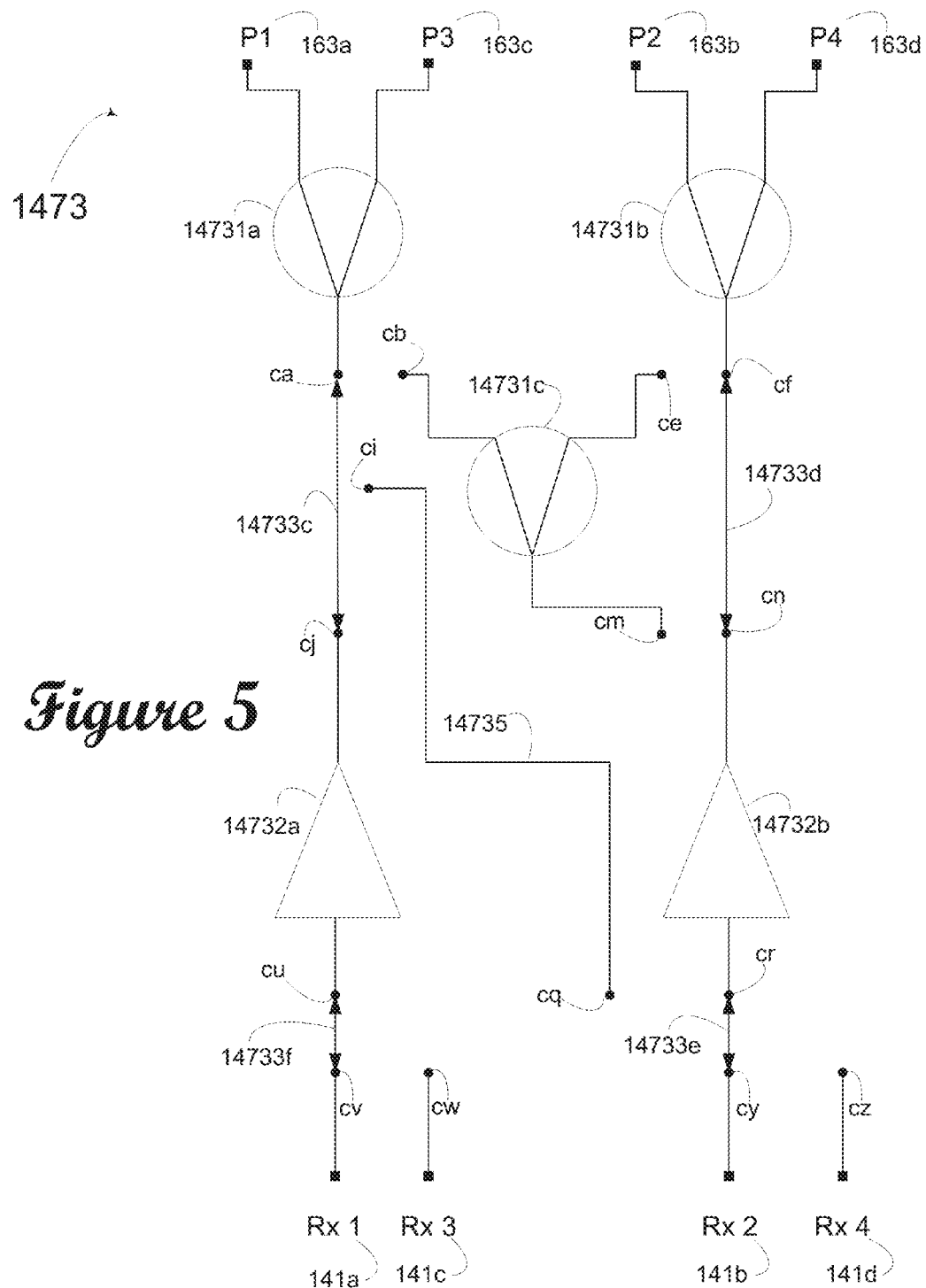
FIG. 5 is a switching diagram depicting the configuration module in a 2×4 with a single jumper board.
Figure 6:
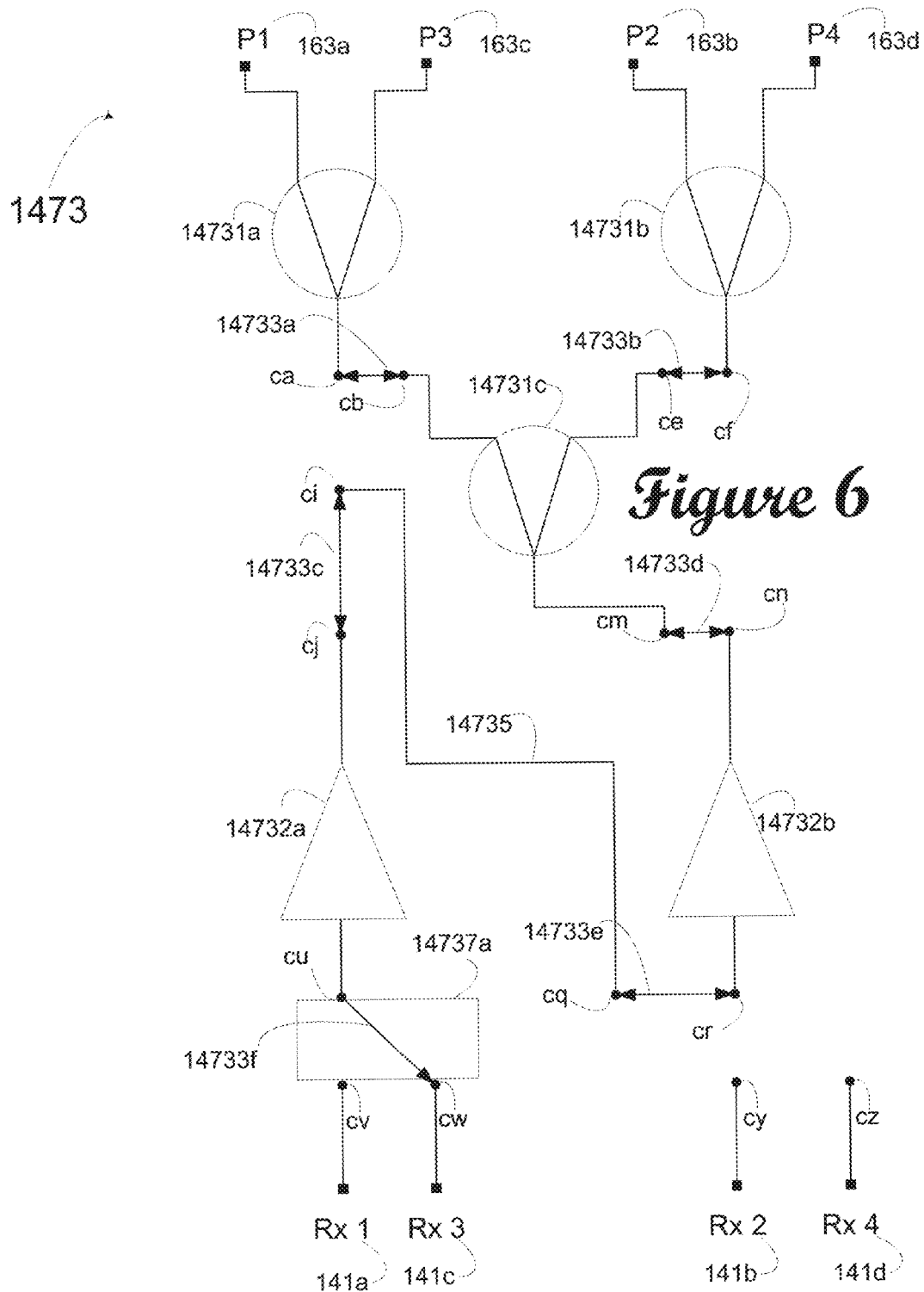
FIG. 6 is a switching diagram depicting the configuration module in a 1×4 with a single jumper board with a 1×4 redundant relay.
Figure 7:
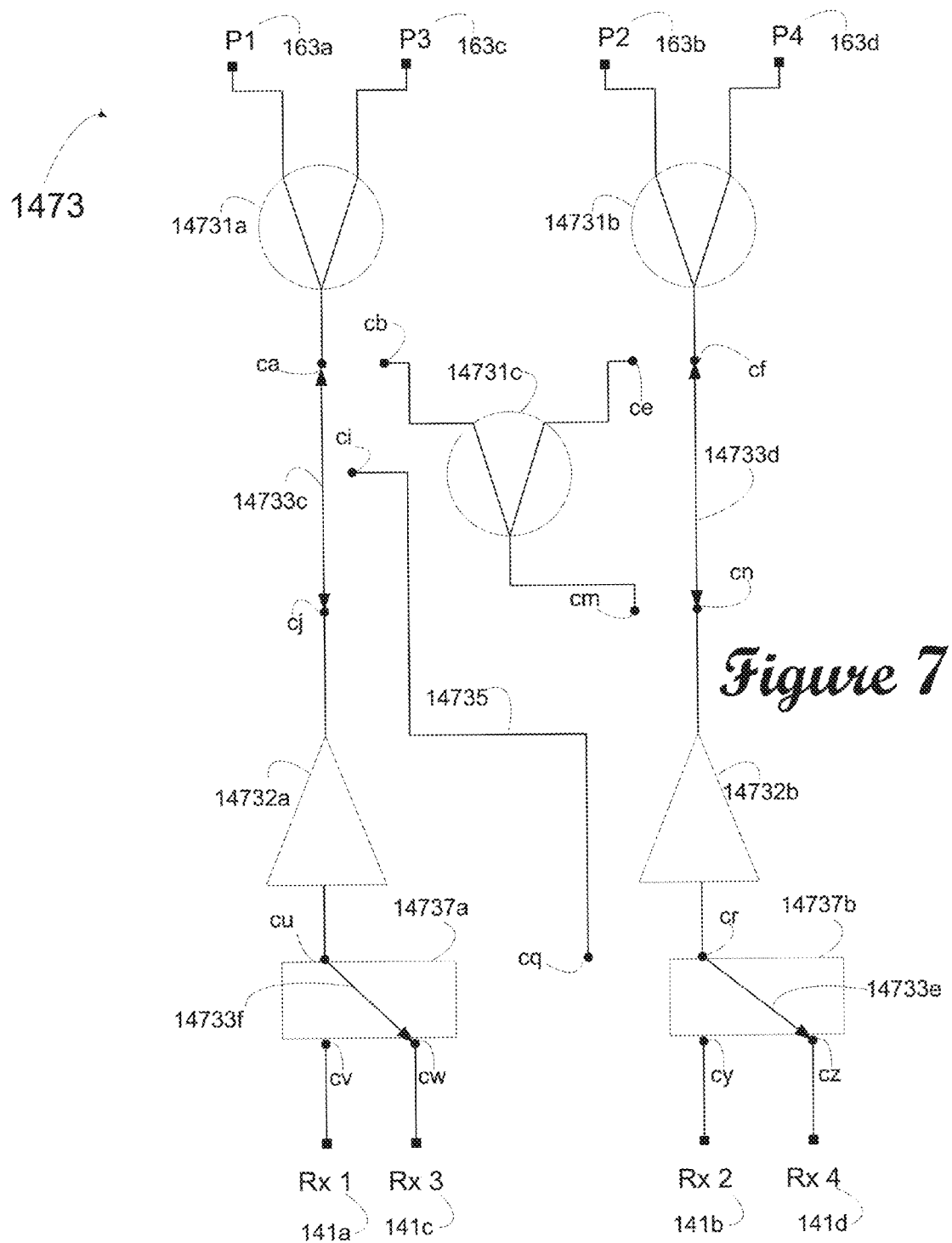
FIG. 7 is a switching diagram depicting the configuration module in a 2×4 with a single jumper board with 1×4 redundant relays.

By way of overview, FIG. 4 depicts a switching diagram depicting the configuration module 147 in a 1×4; FIG. 5 depicts the configuration module 147 in a 2×4; FIG. 6 depicts the configuration module 147 in a 1×4 with a 1×4 redundant relay 14737a; and FIG. 7 depicts the configuration module 147 in a 2×4 with 1×4 redundant relays 14737a, b. The user readily configures the module 147 by simply moving the switch from position to position thereby changing the conductive path through the module 147 and its eight elemental components.

In FIG. 4, though not pictured as such, the jumper switch is in a first position, specifically the "1×4" position. By virtue of being the in first position, only one of the four receivers 141a-d, specifically the first receiver 141a, is placed in electrical contact with the a first amplifier 14732a through movement of one of the switch arms 14733f connecting contacts cu and cv. From the first amplifier 14732a, the electrical path extends to another contact cj. At contact cj, another switch arm is positioned to close the path between contact cj and contact ci thereby incorporating the transverse trace 14735 completing the electrical pathway to contact cq. At contact cq, a third electrical switch arm 14732e connects contact cq to contact cr thereby completing a pathway from the receiver through the first and second amplifiers 14732a, b for a gain four times that of the output of receiver 1 141a to counter losses imparted by a four-way split of the signal. A fourth switch arm 14733d, takes the output of the second amplifier 14732b and directs it from a contact cn to the contact cm for splitting at the splitter 14731c. A fifth switch arm closes contacts ca and cb connecting a second splitters 14731a, while a sixth switch arm closes contacts ce and cf to similarly connect the third splitter 14733b thereby conveying the output signal at unity gain to each of four RF ports.

In FIG. 5, depicts the configuration module 147 as the jumper switch is in a second position, specifically the "2×4" position. All but one of the six switch arms 14733a-e has moved and by that movement, the output of two of the four receivers 141a-d, specifically the first and second receivers 141a will be conducted through the module 147. Additionally, while in this "3+1" position, the first splitter 14731c and the transverse trace 13735 have been isolated, they not being necessary to constitute either of the two conductivity paths through the module 147.

It is worth noting, at this juncture, there are no physical switches nor switch arms. In the presently preferred embodiment, positions of the switch selectively activate transistors to provide the actual switching function that the switch arms 14733a-f portray in these drawings. While a physical switch could be used, the present invention can be enabled by either electronic switching or physical switching, but in this depiction the physical switch is used as a valid analogy to portray movement of the signal through the module 147.

In this second position or "2×4" of the jumper switch, two receivers are placed in electrical contact with separately with either the first amplifier 14732a through movement of one of the switch arms 14733f connecting contacts cu and cv and the second amplifier 14732b when the switch arm 14733e closes contact between contact cr and cy. Switch arms 14733 c and 14733d respectively close contacts between contacts cj and ca to communicate the output of the first amplifier 14732a to the second splitter 14731a and between contacts cn and cf to, likewise, connect the second amplifier 14732b to the third splitter 14732b, thereby completing paths between receiver 1 141a and ports 1 and 3, 163a, c and between receiver 2, 141b and ports 2 and 4, 163b, and d. Thus, the module 147 now enables the "2×4" configuration that the jumper switch indicates.

FIG. 6 is a nearly identical depiction of a "1×4" configuration as is shown in FIG. 4, but is included to demonstrate the virtue of the virtue of the module configuration when considered in the context of the redundant relay 14737a. The redundant relay provides failover protection allowing a relay to bring a second receiver, in this case, receiver 3 141c online in the event that receiver 1 141a should fail. This can be done remotely and, thus, prevents outages necessitating service calls. In a similar manner, FIG. 7 is identical to FIG. 5 except a second relay 14737b is also included to allow redundancy between receivers 2 141b and 4141d.

Having seen the "1×4" and "2×4" modes, it is easy to comprehend that the "3+1" is simply a hybrid of the two achieved by switching. Just as in the "2×4" and "2×4" redundant modes shown in FIGS. 4 and 6, respectively, the output of the first amplifier 14732 a is fed to the first splitter 14731c. While one side of the output of the first splitter 14732 a is fed to the second splitter 14732b, just as in the FIGS. 4 and 6, the second side is fed to a pass-through that attenuates the signal by half, thereby providing the RF port 2, 163b with a signal having unity gain. With reference to the output of receivers 2 and 4, 141b and d, the path is identical to that portrayed in either of FIGS. 5 and 7 except that the first output of the third splitter 14731b that is depicted as flowing into RF port 2 163b (currently receiving the output from the pass-through instead), now is fed into a signal trap that completely attenuates the energy and, thus, the signal at RF port 4 arrives with the same unity gain as its three sisters.

FIGS. 8 through 15 depict various patching arrangements that are possible with the coaxial cords used to place the output from the receivers suitably at the inputs of the bidirectional launch amplifiers. Depicted in each is a block diagram of the base 16 having four launch amplifiers 161a-d and four corresponding RF ports 163a-d. Each of the four launch amplifiers 161a-d are bidirectional and will amplify a signal coming upstream or flowing down with a suitable input or output for each as appropriate. Importantly, for clarity, the configuration modules have been removed from the paths for illustrative purposes. To function as discussed herein, however, the configuration modules must be present.

In each of the several depictions, a series of four coaxial jumper cables is shown acting as "patch cords." A patch cable or patch cord connects ("patches-in") one electronic device to another for signal routing. Generally, as here, patch cords are used to connect devices of different types (e.g., a switch connected to a computer, or a switch to a router). While the patch cords are numbered 151, 152, 153, and 154, this convention is not meant to suggest that the patch cords, as numbered, are the same cords from figure to figure. Rather, they are numbered simply to locate them for the reader in each of the distinct drawings. The use of all other reference numbers herein are according to the standard convention of identifying the component uniquely and consistently from one figure to the next.

Figure 8:
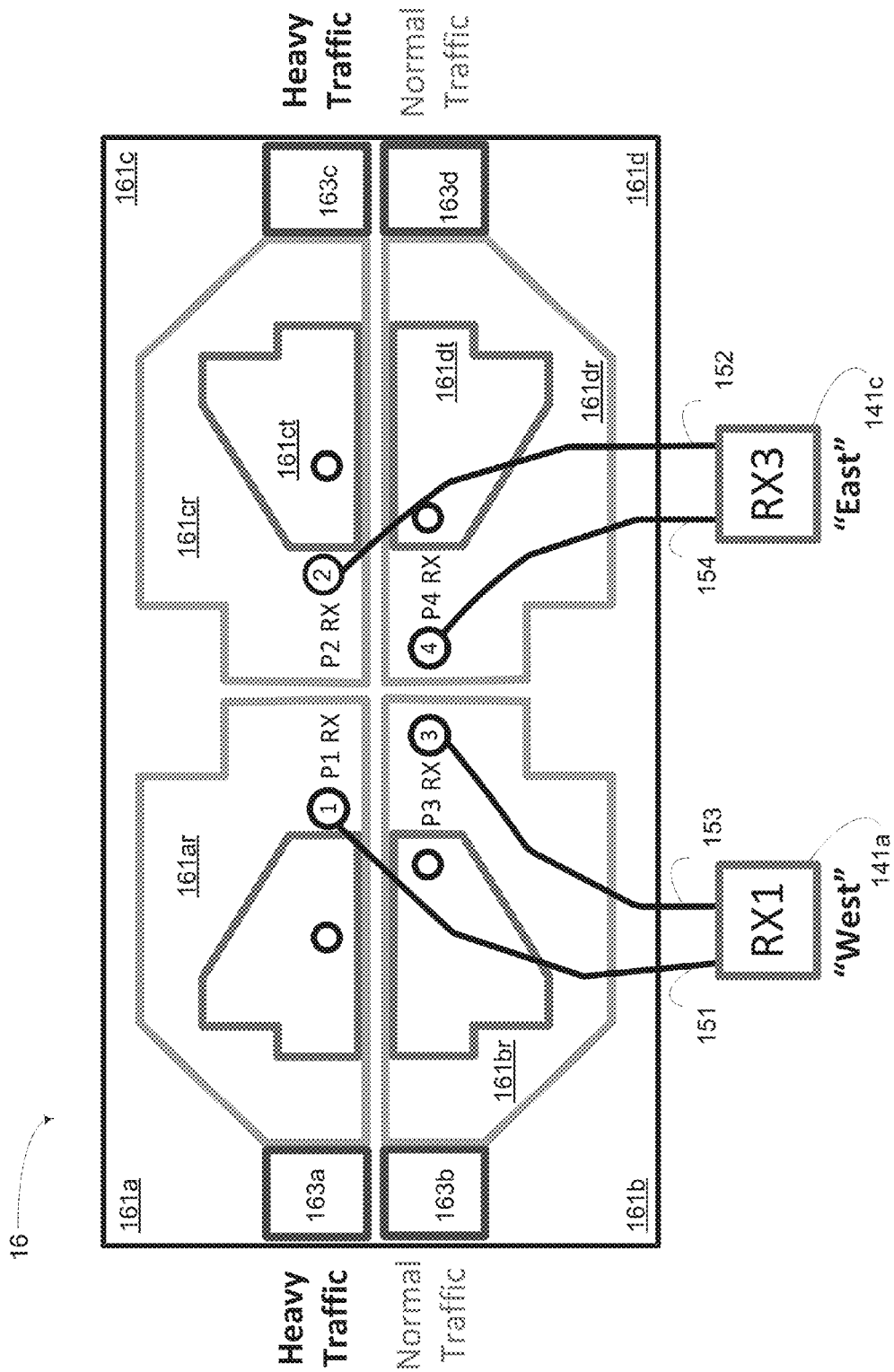
FIGS. 8-13 depict various configurations of coaxial patch cords shown to balance traffic at optical transmitters in response to distinct traffic situations.

In FIG. 8, two of the four receivers, the first receiver 141a and the third receiver 141c, are depicted as connected to individual launch amplifiers 161a-d, likely to show a broadcast configuration of the device as well as its flexibility. In this example, the north RF ports 163a, c are experiencing heavy traffic. Assuming that this load is based upon a relatively stable demand such that it is advantageous to configure the optical node to address this demand. An operator can then split the heavier load between two receivers rather than to assign one to the two RF ports 163a, c, bearing the heavier traffic and one to those ports 163b, d, bearing the lighter traffic. Thus, an operator would want, optimally, to take the output of Receiver 1 and split it between a heavy and a medium traffic port such as RF ports 1 and 2, 163a and 163b. Thus, the operator will connect Receiver 1 141a to the RF ports 1 and 2, 163a, b, with coaxial cable patch cords 151 and 153 at the launch amplifiers on the downstream side 161ar and 161br respectively. In a similar manner, Receiver 3, 141c will send its output through patch cords 152 and 154 to the downstream side of launch amplifiers 161dr and 161cr respectively. Hence, FIG. 8 depicts the use of the patch cords to suitably address long-term changes in traffic.

Figure 9:
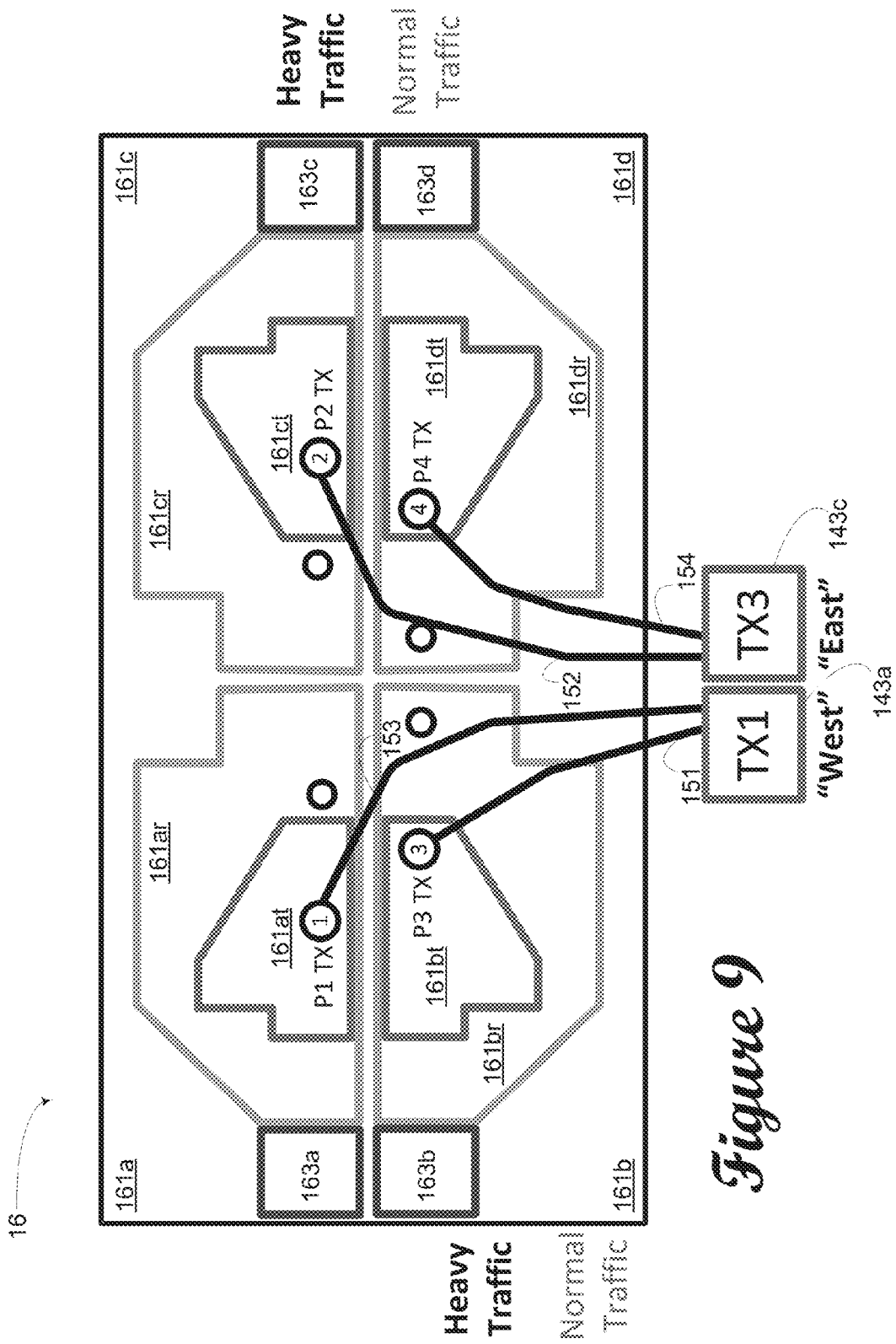

FIG. 9 portrays the upstream configuration of the same traffic issues as FIG. 8 portrays. Once again, heavy traffic on RF ports 1 and 3, 161a and 161c, dictates a need to balance load as between transmitters 1 and 3, 143a, and 143c. To that end, coaxial cables 151 and 153 connect transmitter 1 to each of launch amplifiers 161ar and br on the upstream side. Again, the transmitter 3 is connected to the upstream sides of launch amplifiers at 161ct and dt using patch cords 152 and 154 respectively. In this manner, the load on either transmitter 143a and 143c is balanced relative to the other.

Figure 10:
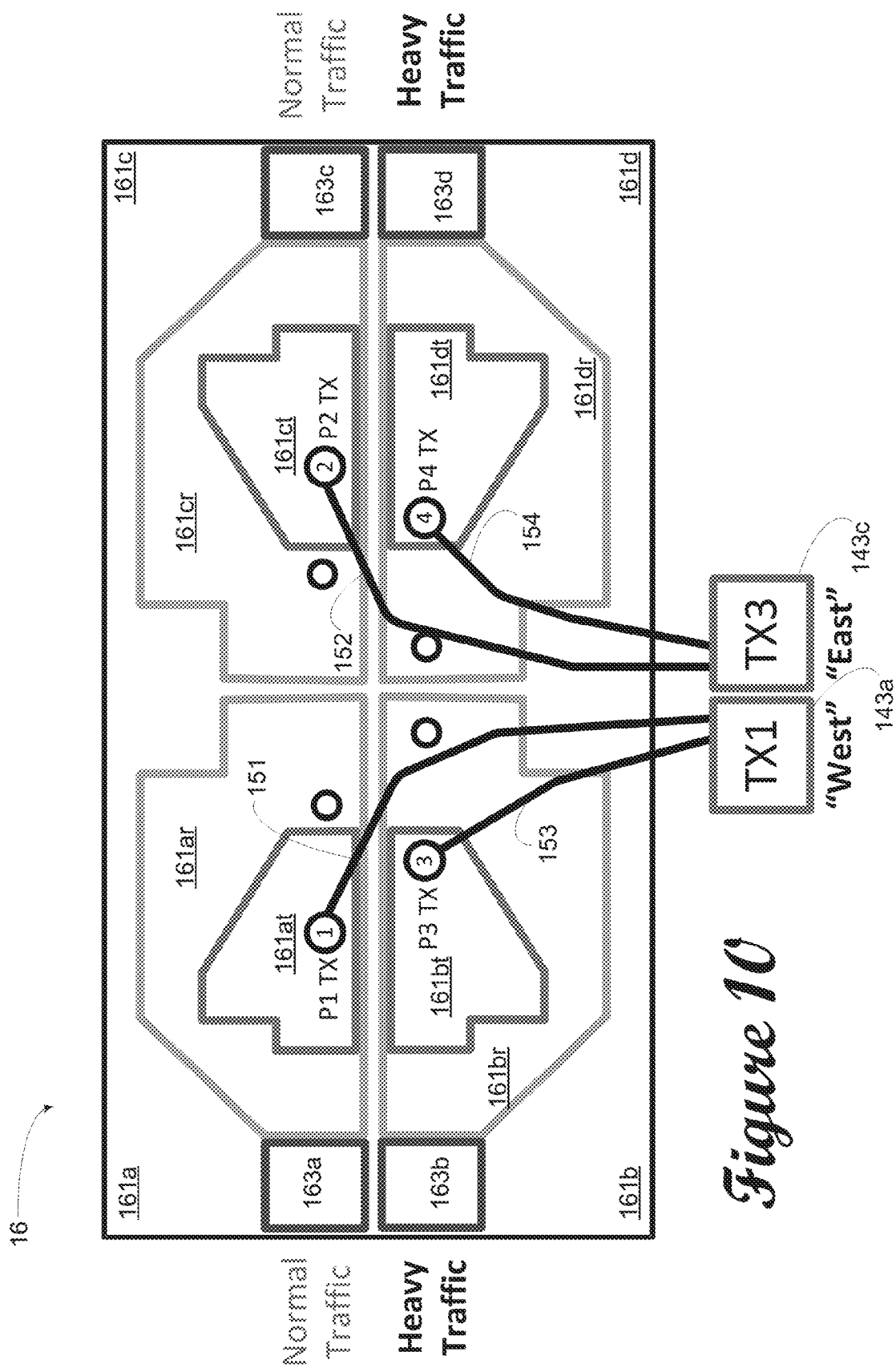

FIG. 10 shows a situation nearly identical configuration but configured as the coaxial cable is, to split the load between heavy traffic and regular traffic, the split is shown to be advantageous when demand shifts. As can be appreciated, when the heavy traffic has shifted from RF Port 1 163a to RF Port 2 163b and likewise from RF Port 3 163c to RF Port 4 163d, the exact same coaxial configuration continues to allow a balanced traffic between Transmitter 1 143a and Transmitter 3 143c. Given these two depicted examples, one can easily see how even shifting loads can be accommodated by judicious selection of correspondence between transmitters and RF ports.

Figure 11:
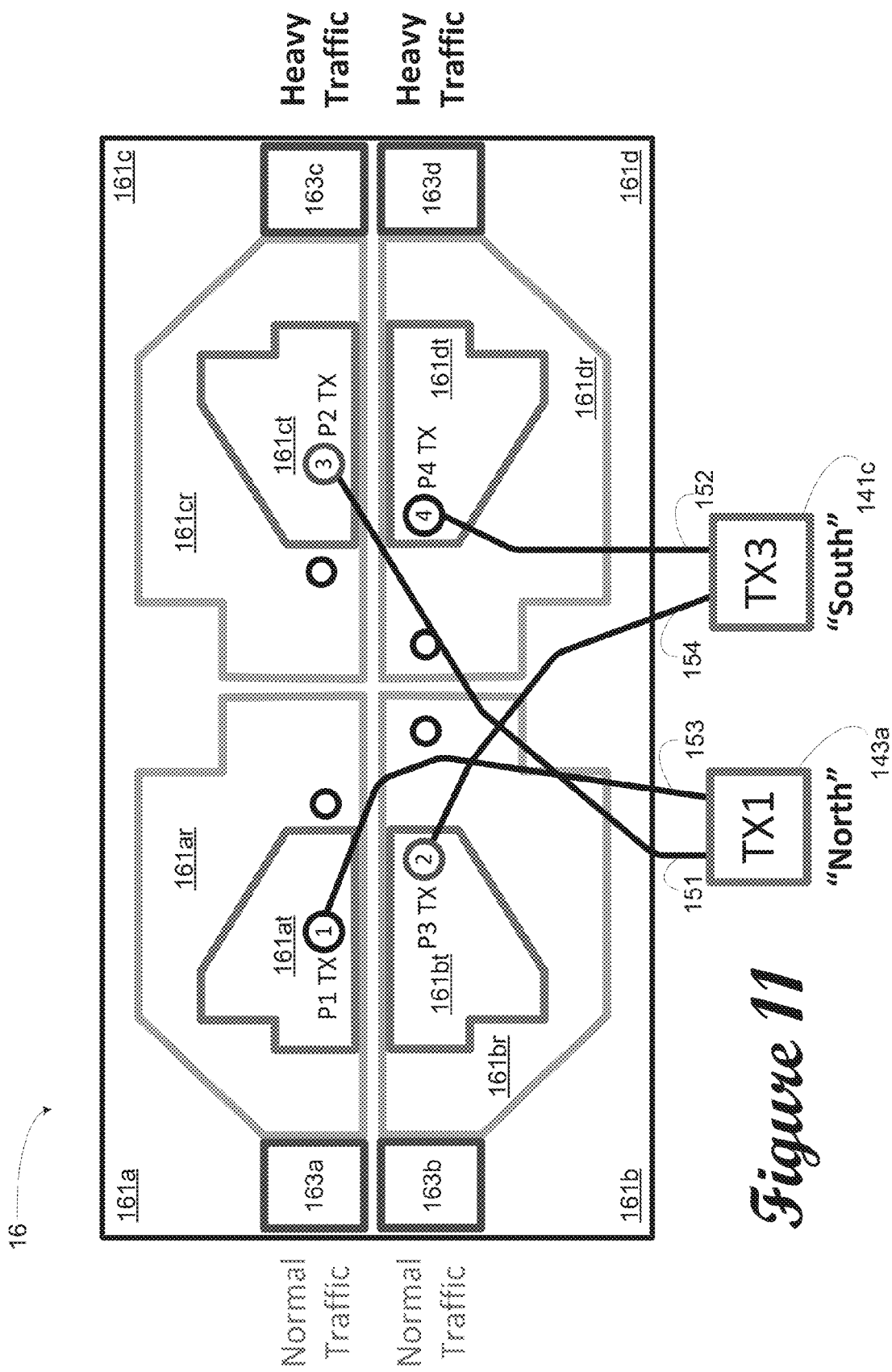

FIG. 11 shows that traffic has moved to a region that had, in FIGS. 9 and 10 had been served by Transmitter 3 alone. A simple exchanging of the patch cords 151 and as they are connect to input ports 161bt and 161ct results in the configuration shown in FIG. 11, thereby returning the balance of traffic as between Transmitter 1 143a and Transmitter 3 143c. Clearly any service interruption necessitated by the exchange of the patch cords 152 and 153 will be minimal given the highly intuitive and extremely simple procedure the patch cord arrangement facilitates.

Figure 12:
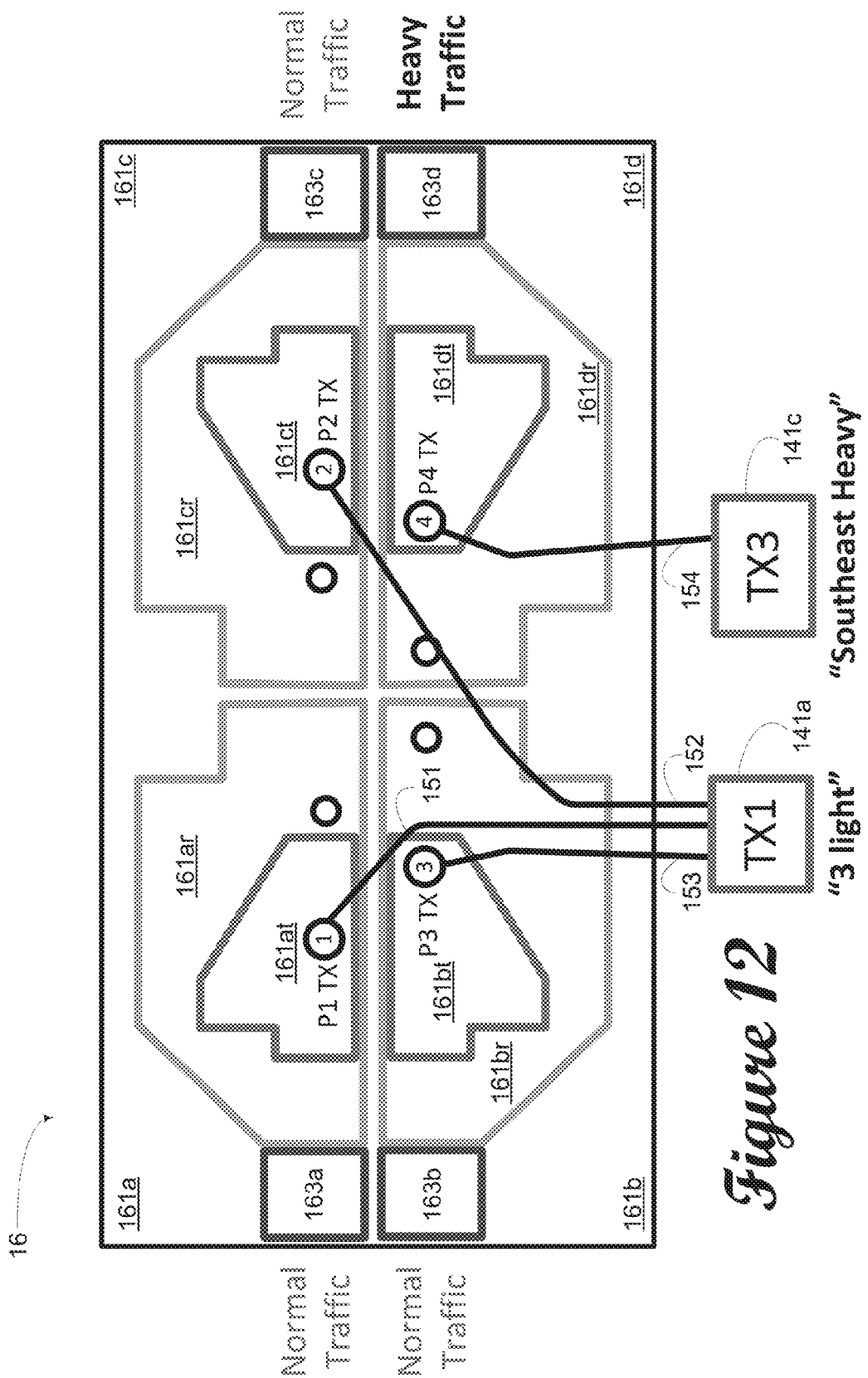

Thus far, we have discussed balanced shifting of traffic such that pairs of ports are experiencing increased or diminished demand. In FIG. 12 a different situation. As discussed in reference to FIGS. 4-7, the configuration module 147 can be configured to a "3+1" configuration just as it can also be configured to a "1×1" with redundancy. Assuming that a service person has suitably adjusted the jumper switches as they are labeled, the output of Transmitter 3, 141c can be dedicated to a single RF port (RF Port 4 163d as illustrated) in response to heavy traffic on that single port. The remaining ports can be serviced by the single Transmitter 1 in "3+1" configuration. Coaxial patch cords 151, 152, and 153 connect RF Ports 1, 2, and 3 163a-c, respectively, to, suitably, balance the traffic between the transmitters.

Figure 13:
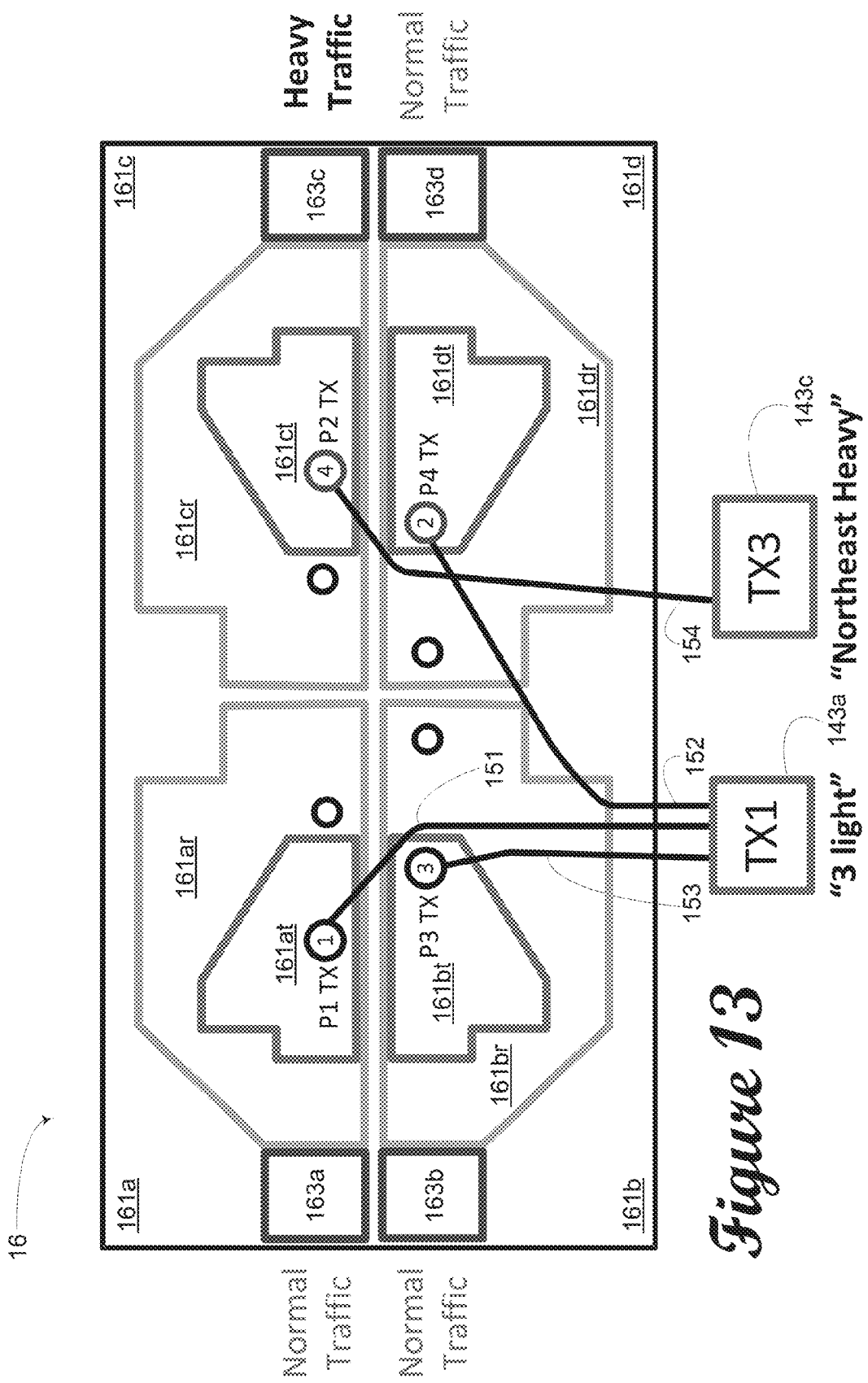

Again, FIG. 13 demonstrates the versatility of the configuration node 10 as traffic loads shift. In this example, the heavy traffic has shifted from RF port 4 163d to RF port 3 163c. Simple exchange of terminal ends of patch cords 152 and 154 results in dedication of Transmitter 3 to the heavy traffic on RF port 3 163c.

While the preferred embodiment of the invention has been illustrated and described, as noted above, many changes can be made without departing from the spirit and scope of the invention. For example, patch cords may be configured to meet other needs according to the earlier explanation. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A configuration module for insertion into an optical node circuit board, including:
- a housing having a first set of terminal pins and a second set of terminal pins for conductive contact between individual traces arranged on the optical node circuit board and selective contact with each of a first set of four passive traces and a second set of four passive traces respectively;
- a jumper switch for selectively connecting the first set of four passive traces to splitting and combining elements in segmented traces across arrayed across a base;
- the first set of four passive traces, when the configuration module is inserted in a first orientation conductively engaging the first set of terminal pins with the individual traces, splitting and combining elements, the splitting and combining elements being selectively connected to enable one of a group of conductive configurations including 1×4, 2×2, and 2+2 configurations, the splitting and combining elements including:
  - three splitting or combining elements; and
  - two operational amplifiers; and
- the second set of four passive traces that when the configuration module is inserted in a second orientation at right angles to the first orientation, conductively engaging the second set of terminal pins with the individual traces in a 4×4 configuration within the configuration module.

2. The configuration module of claim 1, wherein splitting and combining elements are selectively connected in response to selection of one of a group of positions of the jumper switch, the positions selected from the group consisting of the "1×4" position, the "2×2" position, and the "2+2" position.

3. The configuration module of claim 1, wherein the splitting and combining elements are selected from a group consisting of a 1 to 2 splitter and a 2 to 1 combiner and wherein the operational amplifier is an operational amplifier having a gain factor of 2.

4. The configuration module of claim 1, wherein the splitting and combining elements include:
- a signal trap; and
- an attenuator with a ½ gain factor.

5. The configuration module of claim 1, wherein the first set of terminal pins includes at least one relay configured to selectively conductively engage at least one first alternate set of pins to switch from conductive contact with a primary connective element to conductive contact with a redundant connective element the splitting and combining elements being selected from a group consisting of a receiver and a transmitter.

6. A method of configuring an optical node for use to service RF transmitters, RF receivers, and optical ports in configurations including 4×4, 1×4, 2×2, and 3+1 configurations:
- providing a configuration module having a housing having a first set of terminal pins and a second set of terminal pins for conductive contact between individual traces arranged on an optical node circuit board the optical node comprises and for selective contact with each of a first set of four passive traces and a second set of four passive traces respectively, that the configuration module comprises,
  - the housing including a jumper switch for selectively connecting the first set of four passive traces to splitting and combining elements in segmented traces arrayed across a base, the first set of four passive traces,
  - when the configuration module is inserted in a first orientation, conductively engaging the first set of terminal pins with the individual traces, splitting, and combining elements, the splitting and combining elements being selectively connected to enable one of a group of conductive configurations; and
  - the second set of four passive traces when the configuration module is inserted in a second orientation at right angles to the first orientation, conductively engaging the second set of terminal pins with the individual traces presents in a 4×4 configuration within the configuration module;
- when the 4×4 configuration is desired, inserting the configuration module in the second orientation to passively convey an RF signal connecting optical ports to at least one RF transmitter and at least one RF receiver thereby conductively engaging the second set of terminal pins with the individual traces present in the 4×4 configuration within the configuration module;
- when one of the 1×4, 2×2, or 2+2 configurations are desired, inserting the configuration module in the first orientation thereby conductively engaging the first set of terminal pins with the individual traces, splitting, and combining elements, the splitting and combining elements being selectively connected to enable one of the group of conductive configurations; and
- selecting, if a 1×4 configuration is desired, a 1×4 jumper switch position to define a single conductive path to include two amplifiers in series and three splitter/combiners configured such that the first splitter/combiner is conductively connected to the series of two amplifiers and each of the two remaining splitter/combiners such that a single RF path is split to provide four RF paths at the optical ports, each RF path at the optical port having a unity gain fact relative to the remaining RF path;
- selecting, if a 2×2 configuration is desired, a 2×2 jumper switch position to define two congruent conductive paths each path to include an amplifier in series with a splitter/combiner such that each of the two RF paths is split to provide two RF paths at the optical ports, each RF path at the optical port having a unity gain fact relative to that of the remaining RF path; and
- selecting, if a 2+2 configuration is desired, a 2+2 jumper switch position to define three conductive paths to include two passive conductive paths and a third conductive path to include an amplifier in series with a splitter/combiner such that the RF path is split to provide two RF paths at the optical ports, each RF path at the optical port having a unity gain fact relative to that of RF path.

7. The method of claim 5, wherein
- inserting the configuration module in the first orientation includes urging the first set of terminal pins the housing comprises into contact with individual traces arranged on the optical node circuit board; and
- inserting the configuration module in the second orientation includes urging the first set of terminal pins the housing comprises into contact with individual traces arranged on the optical node circuit board.

8. A method for exploiting a configuration module for insertion into an optical node circuit board, including:
- inserting the configuration module, into a housing having a first set of terminal pins and a second set of terminal pins for conductive contact between individual traces arranged on the optical node circuit board and selective contact with each of a first set of four passive traces and a second set of four passive traces respectively, the housing further including a jumper switch for selectively connecting the first set of four passive traces to splitting and combining elements in segmented traces across arrayed across a base, the configuration module in an orientation in one of a group consisting of a first orientation and a second orientation:

the first orientation to conductively engage the first set of terminal pins with the individual traces of the first set of four passive traces, splitting, and combining elements, the splitting and combining elements being selectively connected to enable one of a group of conductive configurations including 1×4, 2×2, and 2+2 configurations, the splitting and combining elements including:
 three splitting or combining elements; and
 two operational amplifiers; and the second orientation to conductively engage the second set of terminal pins with the individual traces of the second set of four passive traces, the second orientation being at right angles to the first orientation, and the individual traces being in a 4×4 configuration within the configuration module.

9. The method of claim 8, further comprising:
selecting, using the jumper switch, a position from a group consisting of: a "1×4" position, a "2×2" position, and a "2+2" position, wherein splitting and combining elements are selectively connected in response to the position.

10. The method of claim 9, wherein the splitting and combining elements are selected from a group consisting of a 1-to-2 splitter and a 2-to-1 combiner and wherein the operational amplifier is an operational amplifier having a gain factor of 2.

11. The method of claim 9, wherein the splitting and combining elements include:
a signal trap; and
an attenuator with a ½ gain factor.

12. The method of claim 8, wherein the first set of terminal pins includes at least one relay configured to selectively conductively engage at least one first alternate set of pins to switch from conductive contact with a primary connective element to conductive contact with a redundant connective element the connective elements being selected from a group consisting of a receiver and a transmitter.

* * * * *